United States Patent Office 2,991,844
Patented July 11, 1961

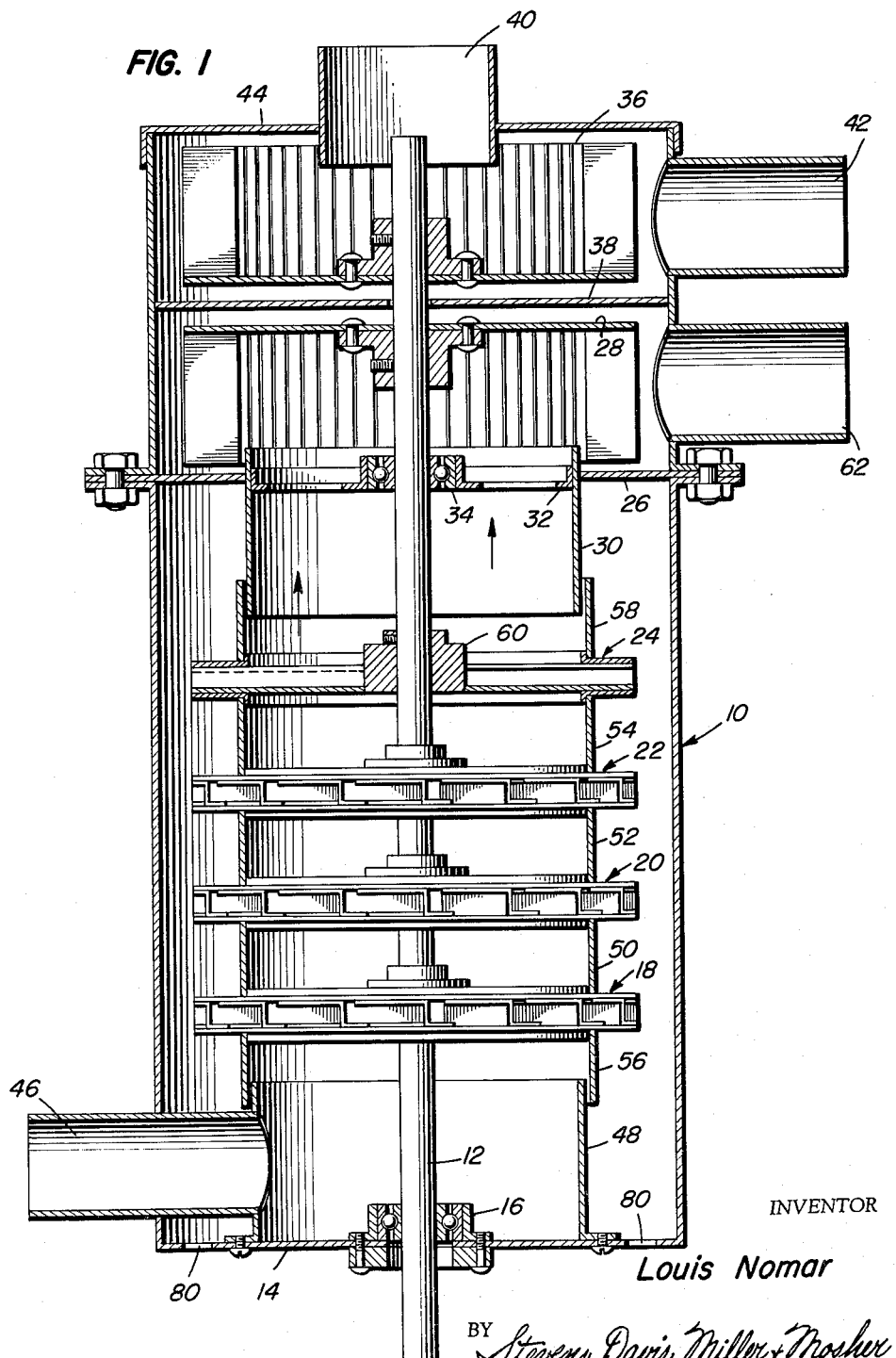

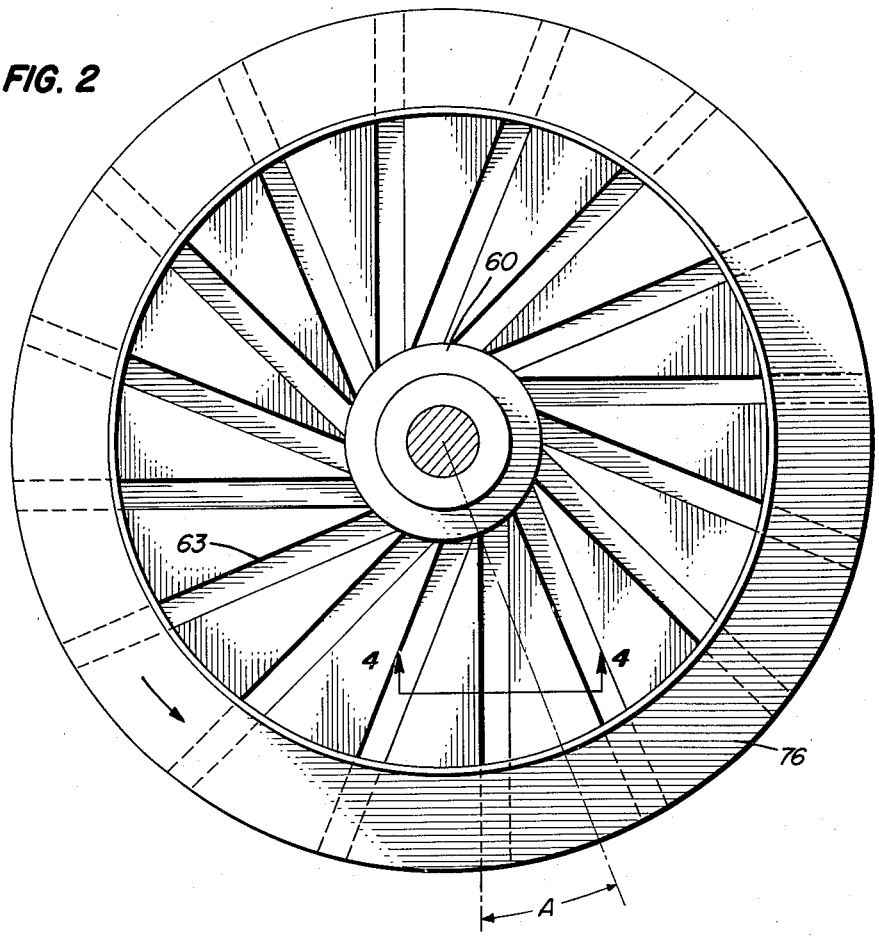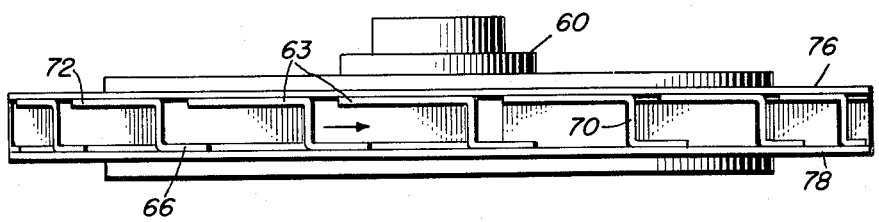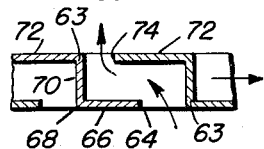

2,991,844
CENTRIFUGAL AIR CLEANER
Louis N. Nomar, 1614 7th Ave., Charleston, W. Va.
Filed June 27, 1958, Ser. No. 744,972
4 Claims. (Cl. 183—77)

This invention relates to a centrifugal air cleaner. More particularly, the invention relates to a centrifugal air cleaner for internal combustion engines.

Internal combustion engines employ huge amounts of air in order to operate. Ordinary atmospheric air is usually dust laden. It will be appreciated therefore that enormous amounts of dust would be sucked into the cylinders of an internal combustion engine if no provision were made to clean the air. Dust laden air is, of course, extremely deleterious to the carburetor and to the cylinders since the dust is oftentimes of an extremely gritty nature. Dust in the carburetor is an unfortunate happenstance since its utilitarian function depends upon the formation of spray consisting of fuel and air. The carburetor is subject to a finely adjusted balance of air and fuel. Any constriction in the carburetor passageways caused by dust would be most deleterious to the established balance. In the case of the introduction of dust laden air into the cylinders of an internal combustion engine, the dust acts as an abrasive so that the cylinder walls and pistons become pitted and worn.

The prior art is replete with a great number of devices for cleaning atmospheric air. These devices are of varying degrees of complexity. Oftentimes simply a metal wool pad is inserted in the passageway leading to the carburetor. In some other devices, a simple trap is employed. More complicated air cleaners consist of passing the air through an oil bath so that the oil traps the dust particles. All of these devices must be periodically cleaned in order to preserve their useful function.

A more advanced type of air cleaner is the centrifugal type of air cleaner. In this type, atmospheric dust laden air is passed axially to turbine-like arrangement. The impeller blades of the turbine give the dust particles a momentum radially to the axial flow of air. The dust particles are thusly thrown to the side of the turbine housing. An arrangement is usually provided for collecting the dust. The cleaner air continues to flow in an axial direction for ultimate utilization. In the prior art type of centrifugal air cleaners, the blades usually become dust laden due to the natural greasiness of the dust particles. When the blades become dust encrusted, their efficiency drops so that the amount of air delivered to the engine is decreased. Additionally, the prior art-type air cleaners create undesirable pressure in the spaces designated to accumulate the dust.

Accordingly, it is a primary object of the present invention to disclose an air cleaner of the centrifugal type having novel and unique advantages.

It is another object of the present invention to disclose an air cleaner of the centrifugal type which has a propensity to maintain its impeller blades in a dust encrusted-free condition.

It is still another object of the present invention to disclose an air cleaner to be utilized in cleaning combustion-supporting air for internal combustion engines.

It is yet another object of the present invention to disclose an air cleaner of the centrifugal type having means for removing dust from air.

Additional objects and advantages of the present invention will become apparent from a detailed consideration of the following description.

In the drawings, wherein like symbols refer to like or corresponding parts throughout the several views:

FIGURE 1 is a view in cross-section taken from a side elevation of the centrifugal air cleaner of the present invention;

FIGURE 2 is a top view of one of the impeller units;

FIGURE 3 is a side view of one of the impeller units; and

FIGURE 4 is a view in cross-section taken along line 4—4 of FIGURE 2.

Turning to the drawings, particularly to FIGURE 1, reference numeral 10 designates the cylindrical housing containing the centrifugal air cleaner of the present invention. Within the housing, drive shaft 12 is centered and rotatably mounted at two points. The drive shaft 12 is journalled at the bottom 14 of the housing by bearing means 16 which in FIGURE 1 is shown to have suitable ball bearings. Cylindrical housing 10 is divided into three main compartments. One compartment contains a plurality of impeller units 18, 20, 22 and 24. The impeller units are mounted in spaced relationship on the drive shaft 12. Annular wall 26 separates the compartment containing the impeller units and the compartment containing blower 28 which is also mounted on the drive shaft. Tubular member 30 is suitably mounted on the inner periphery of annular wall 26 and is concentric with the housing and drive shaft. It is seen that tubular member 30 effects communication between the compartment containing the impeller units and the compartment containing the blower. A bracket arrangement 32 of the spider type is mounted inside the tubular member 30. Journalling means 34 for the drive shaft is mounted in the center of the bracket. Thus, at least two journalling means are provided for the drive shaft.

A third compartment within housing 10 is situated within the top portion thereof. A blower 36 in the third compartment is mounted on the drive shaft near the terminal portion thereof. The third compartment is separated from the other compartments by wall 38. There is no communication between the third compartment and the other compartments. However, a concentrically situated ingress port 40 is provided at the top of housing 10 to permit the introduction of air into the center of the blower 36. Compressed air is expelled through egress port 42 situated in the side of the housing 10. Housing 10 is capped by top 44 which is secured to the sides of the housing by such suitable means as welding.

Returning once again to the lower portion of the housing and particularly to the two lower compartments therein, an ingress port 46 is provided along the side near the bottom portion of the housing 10. Ingress port 46 acts as a conduit for air, carrying it to within concentrically situated tubular member 48. Tubular member 48 has a diameter which is sufficiently less than the diameter of the housing so that an annular space is provided therebetween. Furthermore, tubular member 48 is suitably secured to the bottom of the housing 14.

As was stated in the above, impeller units 18, 20, 22 and 24 are in spaced relationship. They are separated by separator tubular members 50, 52 and 54, all having identical diameters which are located near the outer periphery of the impeller units. Tubular member 56 has the same diameter as the separator members but is slightly greater than tubular member 48 and extends below the top thereof. Situated above impeller 24 is a tubular member 58 which also has the same diameter as the separator members but yet is slightly larger than communicating tubular member 30. It will be appreciated that by means of the various tubular members just described, an inner compartment within the housing is achieved and that an outer annular space surrounds the inner compartment. Communication between the two is accomplished through the impeller units, more about which will be said below. The impeller units are secured to the drive shaft by frictional screw means in a longitudinally extending flange from the hub 60. This arrangement can be readily seen in connection with impeller 24 which shows a cross-sectional view of the impeller taken through its center.

Another egress port 62 is provided from the side of the housing. This egress port is situated to receive the compressed gas from blower 28.

Now turning to the FIGURES 2, 3 and 4 for a more detailed consideration of the impeller units, the impeller unit has a hub 60, as was disclosed in the above. A plurality of impeller blades 63 extend non-radially outward from the outer periphery of the hub, as best shown in FIGURE 2. The vertical section 70 of each impeller blade, at its point of connection to the hub 60, forms an angle A with the radius extending outwardly from the center of the hub through the point of connection as shown in FIGURE 2. The angle A, which defines the non-radial condition of the impeller blades is preferably about 15°. The impeller blades 63, when viewed from the side (as shown in FIGURES 3 and 4), transcribe an inverted straight sided S configuration. Directing particular attention to FIGURE 4, it will be seen that when the impeller unit is rotated in a counterclockwise manner, as designated by the arrow pointing towards the right in this figure, the leading edge 64 of the impeller blade will be the most forward of the horizontal portion 66 of the inverted S. The back edge 68 of the impeller blade will then be between the said horizontal portion and the vertical section 70 of the impeller blade. The top horizontal section 72 of the blade culminates in a trailing edge 74. Horizontal section 72 is wider than the lower horizontal portion 66 so that the trailing edge of one impeller blade overlaps the leading edge of the impeller blade directly behind it, although in spaced relationship therewith.

Flat annular rings 76 and 78 are situated at the top and bottom of the impeller unit. The impeller blades culminate with the outer periphery of the two annular rings. A flange along the inner edge of the two annular rings extends outwardly from the impeller unit. It is pointed out that all the impeller units have mounted thereon the annular rings with extending flanges. In connection therewith, attention is drawn to FIGURE 1. The separator tubular members discussed in the above and illustrated by FIGURE 1 are in secured juxtaposition with the flanges.

In operation, the impeller units 18, 20, 22 and 24 and fan blowers 28 and 36 are driven in a counterclockwise direction by applying motive power (not shown) to drive shaft 12. Air is introduced through ingress port 46. This may be accomplished by positive pressure means or by negative pressure established by blower 28. Air entering the space surrounded by tubular member 48 subsequently flows axially into the spaces between the blades of the first impeller unit 18. Dust particles are given momentum by the impeller blades so that they are centrifuged out of the unimpeded space between the impeller blades in a generally radial direction. The dust particles are thereby carried to a point beyond the impeller blades which is in the space between the tubular separators and the inner wall of the housing 10. The dust particles are usually hurled against the inner wall of the housing 10 and then fall toward the bottom 14 of the housing. The dust particles are removed from the space by means of access ports 80 in bottom 14. It will be appreciated that thereby the accumulated dust particles may be continuously removed from the air cleaner. The air is permitted to pass between the impeller blades. It then continues to flow in an axial direction. A plurality of impeller units are employed in order to ensure a substantially complete removal of dust particles from the air. After passing through all the impeller units, the now cleaned air is picked up by the blower 28 and passed out of egress port 62 to its ultimate destination.

The blower 36 in the third compartment is utilized to deliver uncleaned air to any desired point. Since the instant air cleaner is to be associated with internal combustion engines, particularly with internal combustion engines supplying motive power to vehicles, a cab or housing is provided for personnel which requires fresh air. Such fresh air may be provided by blower 36 in the independent third compartment. The air enters ingress port 40 and exits from egress port 42 under positive pressure. If desired, the uncleaned air from egress port 42 may be led to ingress port 46. In such an event, the air introduced into the air cleaner will already be under a positive pressure.

The air cleaner of the present invention may be constructed of any sufficiently rigid material, such as steel. However, if desired, certain rigid plastic materials may be employed. The number of impeller units may be varied from that shown by the exemplary embodiment described in the above. Further, the fan blower 28 may be replaced by any other suitable compressor means. As a matter of fact, the compressor means may be entirely eliminated. Instead, air may be introduced under pressure into ingress port 46. In other words, air may be supplied in a manner to ensure good axial flow of air through the impeller units.

It will be seen from FIGURE 1 that the housing 10 is constructed of two units. The compartment containing the impeller units is separate from the compartments containing the blowers 28 and 36. The two units are bolted together with annular wall 26 being a rigid gasket therebetween. The housing may be of a unitary nature, although the housing herein described is of such a nature to ensure easy access to the moving parts for servicing.

It will be apparent that many changes and modifications of the several features of the device described herein may be made without departing from the spirit and scope of the invention. It is therefore to be understood that the foregoing description is by way of illustration of the invention rather than limitation upon the invention.

What is claimed is:

1. A centrifugal air cleaner comprising a vertical cylindrical housing, a vertical drive shaft rotatably mounted within said housing and coaxial therewith, a plurality of impeller units mounted in vertically spaced relationship on said drive shaft within said housing, each of said impeller units comprising a hub secured to said drive shaft and a plurality of horizontally and outwardly extending non-radial impeller blades, an upper flat and horizontal annular ring attached to the upper surfaces of the impeller blades of each impeller unit, a lower flat and horizontal annular ring attached to the lower surfaces of the impeller blades of each impeller unit, an upper tubular element attached to and extending upwardly from the upper annular ring on the uppermost impeller unit, a lower tubular element attached to and extending downwardly from the lower annular ring of the lowermost impeller unit, an intermediate tubular element extending between and attached to the proximate annular rings of each adjacent pair of impeller units, means for directing a flow of air axially to the lowermost impeller unit, means for directing a flow of clean air axially from the uppermost impeller unit, all of said tubular elements being coaxial with said drive shaft and forming with said cylindrical housing an annular space for receiving the dust from the air which passes through said impeller units, all of said annular rings being coaxial with said drive shaft.

2. The centrifugal air cleaner of claim 1 wherein the impeller blades describe in vertical cross-section a straight sided inverted S configuration and the lower portion of the S forms a front leading edge when the impeller unit is rotated.

3. The centrifugal air cleaner of claim 1 wherein each of the impeller blades extend outwardly from the hub at an angle of approximately 15° with the radial line drawn from the center of the hub and passing through the point of connection between said hub and each of said impeller blades.

4. The centrifugal air cleaner of claim 3 wherein the impeller blades describe in vertical cross-section a straight sided inverted S configuration and the lower portion of the S forms a front leading edge when the impeller unit is rotated.

References Cited in the file of this patent

UNITED STATES PATENTS

| | | |
|---|---|---|
| 1,059,161 | Huguenin | Apr. 15, 1913 |
| 2,140,953 | Dugan | Dec. 20, 1938 |
| 2,364,368 | Jarnaker | Dec. 5, 1944 |
| 2,453,593 | Putney | Nov. 9, 1948 |